INVENTORS
ROBERT B. TAYLOR
STANLEY D. PAYNE
ROBERT G. WALKER
BY Albert L. Jeffers
Attorney Aug. 30, 1966
R. B. TAYLOR ETAL
3,269,721
COLLATOR
Filed Nov. 26, 1963
8 Sheets-Sheet 5
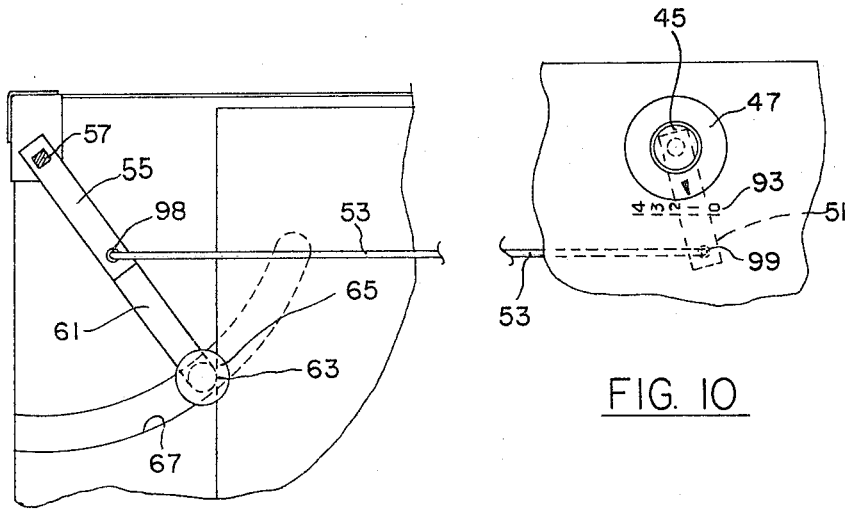
FIG. 9
FIG. 10
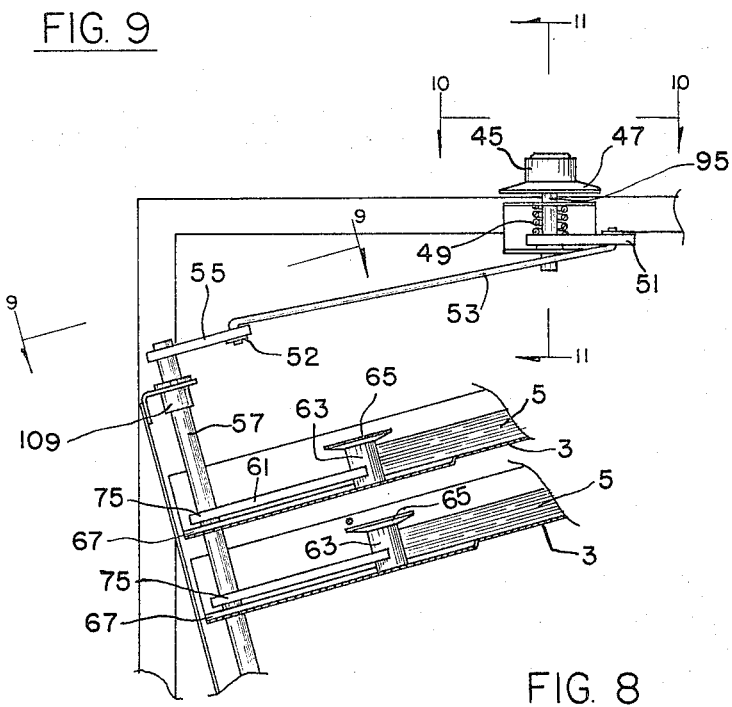
FIG. 8
INVENTORS
ROBERT B. TAYLOR
BY STANLEY D. PAYNE
ROBERT G. WALKER
*Albert L. Jeffers*
Attorney Aug. 30, 1966  R. B. TAYLOR ETAL  3,269,721
COLLATOR Filed Nov. 26, 1963  8 Sheets-Sheet 8

INVENTORS
ROBERT B. TAYLOR
BY STANLEY D. PAYNE
ROBERT G. WALKER

Albert L. Jeffers
attorney

United States Patent Office 3,269,721
Patented August 30, 1966

3,269,721
COLLATOR
Robert B. Taylor, 1009 W. Berry St.; Robert G. Walker, 4217 Buell Drive; and Stanley D. Payne, 2401 Charlotte Ave., all of Fort Wayne, Ind.
Filed Nov. 26, 1963, Ser. No. 326,082
8 Claims. (Cl. 270—58)

This invention relates to improvements in collators and the like, used for the purpose of assembling pages of written or printed material in numerically consecutive order, rapidly and simply, providing a means of assembling the groups thus collected so that each group can be made complete and ready for binding, stapling or filing.

Many of the collators in use are quite expensive and not generally portable, unless they are provided with wheels or casters as a part of the equipment. The less expensive models are usually tiresome to operate for substantial periods of time due to the excessive movements required by the operator, and possess other objectionable features, which, if eliminated, would materially improve the acceptability of such equipment.

An undesirable feature of the prior art collators concerns the methotd of gathering the pages from the machine, wherein each page is caused to hang outwardly and downwardly from a tray upon which it is stored and is then removed by an operator. It is cumbersome to collect by hand as many as ten pages which are dispensed in the manner described. Also, the operation of gathering such pages in a short time becomes tiresome after extended use. Our invention is intended to eliminate this disadvantage, and at the same time facilitate and increase the rate of collator operation.

An objectionable feature with presently used collators of inexpensive construction, relates to their inconvenient method of adjusting the machine for various paper lengths. With some collators of the class described it is necessary to remove each individual tray and then actually move the back-up plate from one position to another, at the same time fastening said plate to the tray to prevent its becoming dislodged or out of proper position. A salient object of our invention is to provide a convenient method of adjusting the machine for various paper lengths. The trays in our collator are fastened to the frame of the machine and become integral parts thereof. Prior to loading the trays with paper an adjustment to adapt the trays for the proper paper length is made between predetermined limits.

Prior art collators are generally incapable of handling as wide variety of pages which can be successfully handled in the present invention. For example, the feeding mechanism of the collator in the present invention is capable of handling paper from 6 lbs. to 100 lbs., bond, mimeograph, calendered, glazed, and also plastic sheets. The collators in the prior art, with the possible exception of expensive vacuum lift feeder mechanisms, are incapable of duplicating or approximating the accuracy achieved by our collator. It is only with very expensive, highly complicated feeding mechanisms that it is possible to achieve versatile degree of handling of materials.

An object of this invention is to provide a collator which can operate intermittently in that the collator will actuate a page from each tray to a predetermined point and remain at this point until the pages are removed from the gatherer. Another advantage of our collator is the provision of means to change the intermittent operation to be a continuous operation in that the collator will push the pages into the gatherer, and if they are not removed by the operator the collator will return the pages to the storage trays, and immediately thereafter return the pages again to the gatherer.

Another distinguishing feature of the present invention is its application of novel spring means which hold the sheets against distortion, regardless of their composition, weight or size so that they can be uniformly handled. This is achieved by long flat springs which extend over the sheets and bear downward against the sheets over a substantial distance which prevents pages from buckling or distorting when urged in either forward or backward direction.

With these foregoing disadvantages of the prior art in mind, it is one of the principal objects of the present invention to provide a simple and inexpensive collator mechanism which is readily adaptable to many different sizes of pages having different characteristics.

Another object of the present invention is to provide an inexpensive collator mechanism which can be readily loaded with pages without removing any portion of the collator so that the process of loading the collator for use can take place conveniently and without substantial time delays.

A still further object of the present invention is an improved method whereby the rate of collating operation can be increased because of the improved ease of handling the paper. Because of the simplified, controllable method of delivery of the paper by the collator, it is also possible to integrate the operations of several collators whereby a number of collators can be coordinated in operation, with one operator.

A still further object of the present invention is to provide a collator which is capable of dispensing pages having substantially varying properties. For example, the collator can be used for dispensing varnished pages, plastic sheets, light weight flexible papers, heavy stiff papers, bond, mimeograph, and calendered or glazed sheets. The collating machine of our invention is adapted to effect its dispensing operation for the diverse pages, without necessitating any adjustments of the machine and the pages which are light or thin in nature are held during dispensing without folding or buckling, owing to a novel arrangement of flexible flat steel springs which are in contact with the pages while they are in storage in the trays and are being dispensed.

A still further object of the present invention is to provide a collator including trays arranged parallel to each other. The pages are then fed out a predetermined distance from each tray into a gatherer which guides the pages to a central point for ease of grasping and removal.

One of the important objects of the present invention is that provision is made for displacing the pages in respective trays by differential distances so that the projected ends of the pages are brought substantially into edge-to-edge alignment where they project to a predetermined delivery point and can be gripped and normally pulled the rest of the way out of the trays. The pack includes all of the pages in the correct order and are easily stacked with even edges, by use of a flat ledge below the delivery point.

A still further object of the present invention is to provide a collating device which can be varied in operation, to be either automatic in dispensing a set of pages and will thereafter terminate and recycle only on demand, or, can be made continuous in operation so that a set of pages is dispensed during each increment of time.

Another object of this invention is to provide a collating machine having paper loading controls which will stop the collating machine when all of the pusher arm assemblies are at the rear of the trays and raised to contact the uppermost sheet in the trays after they are reloaded.

Other objects and features of the present invention will become apparent from a consideration of the following description, which proceeds with reference to the accompanying drawings, wherein:

FIGURE 8 is a fragmentary detail view of the paper stop and control mechanism for positioning the stops relatively to different lengths of papers or other sheets in the trays;

Figure 12:
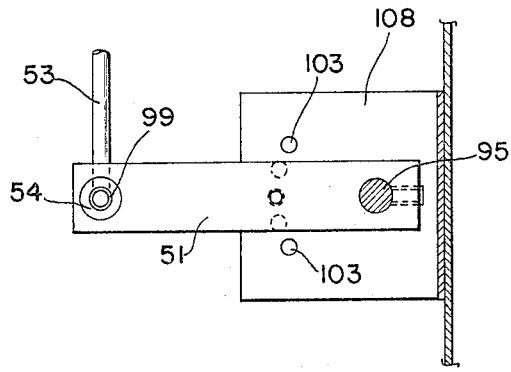
Figure 11:
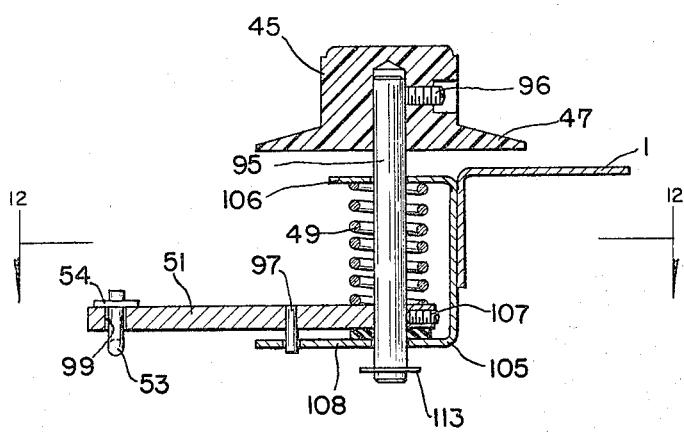
Figure 15:
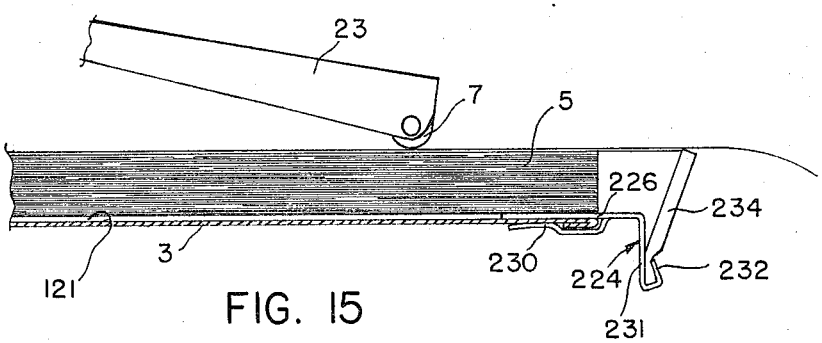
Figure 14:
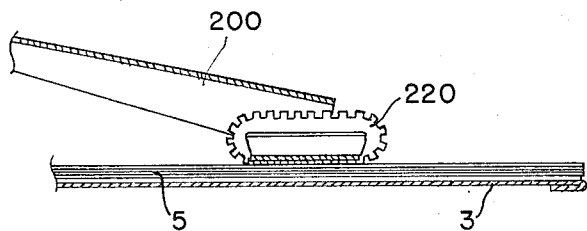
Figure 13:
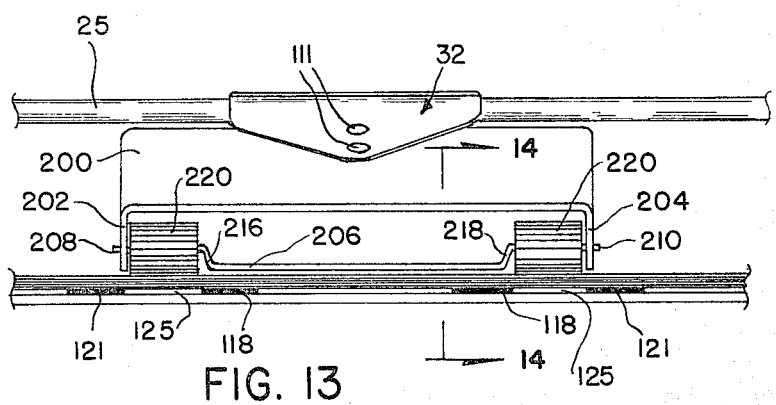
Figure 17:
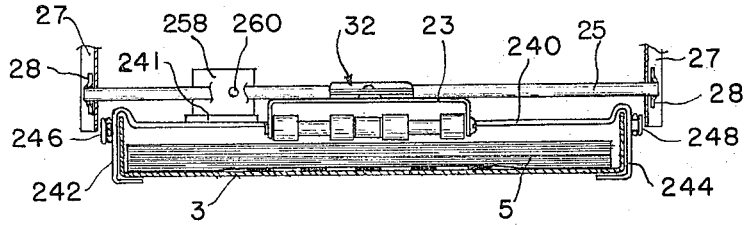
Figure 16:
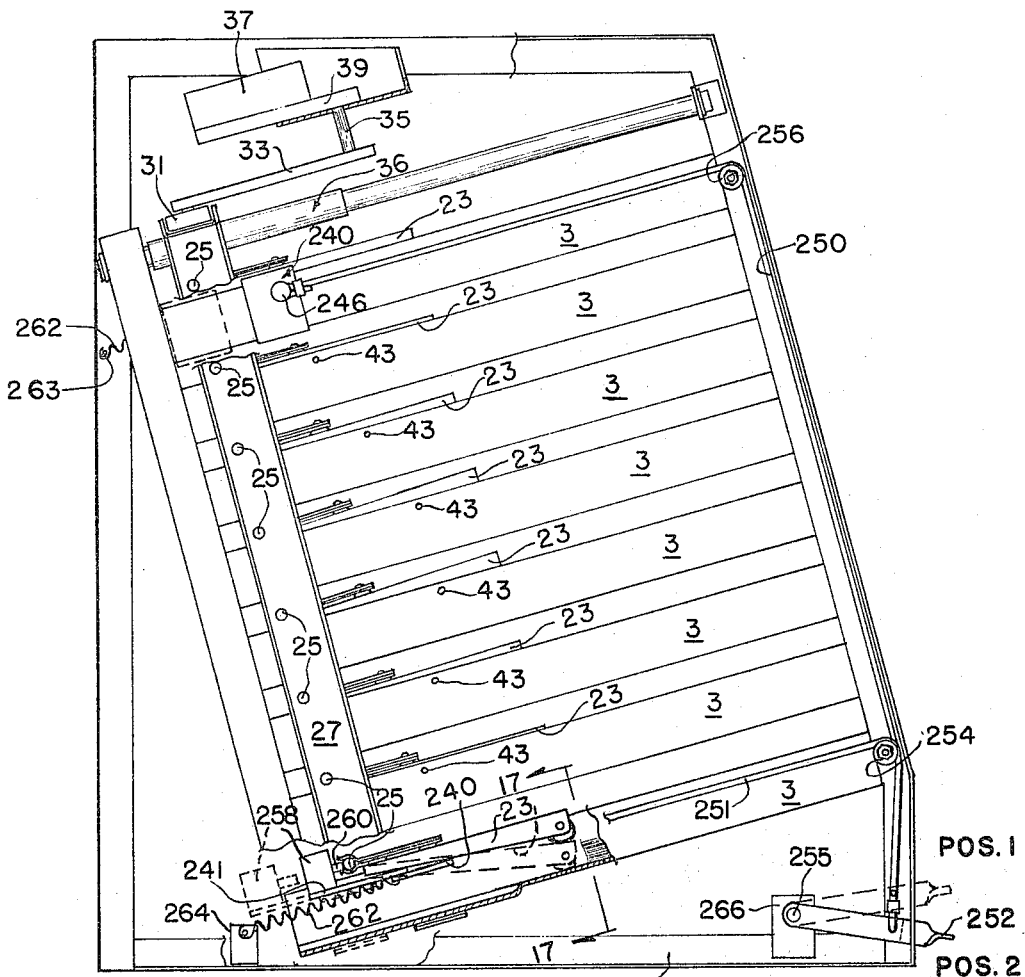

FIGURES 9 and 10 are detail views of the structure shown in FIGURE 8, and looking in the direction of the arrows 9—9 and 10—10 of FIGURE 8;

FIGURE 11 is a part sectional detail view of the structure shown along lines 11—11 in FIGURE 8;

FIGURE 12 is a partial section view of FIGURE 11 taken along lines 12—12 of FIGURE 11;

FIGURE 13 illustrates a front detailed view of a modified form of the pusher arm assembly;

FIGURE 14 is a sectional view looking in the direction of arrows 14—14 in FIGURE 13;

FIGURE 15 is a sectional view of a tray and clip which is adapted to be fastened to the front portion of the tray;

FIGURE 16 is a side elevational view of the collating machine with the housing and gatherer removed and a portion of the tray broken away to illustrate the interior of the collator and showing the loading controls of the collator; and, FIGURE 17 is a sectional view taken along the line 17—17 in FIGURE 16.

Figure 1:
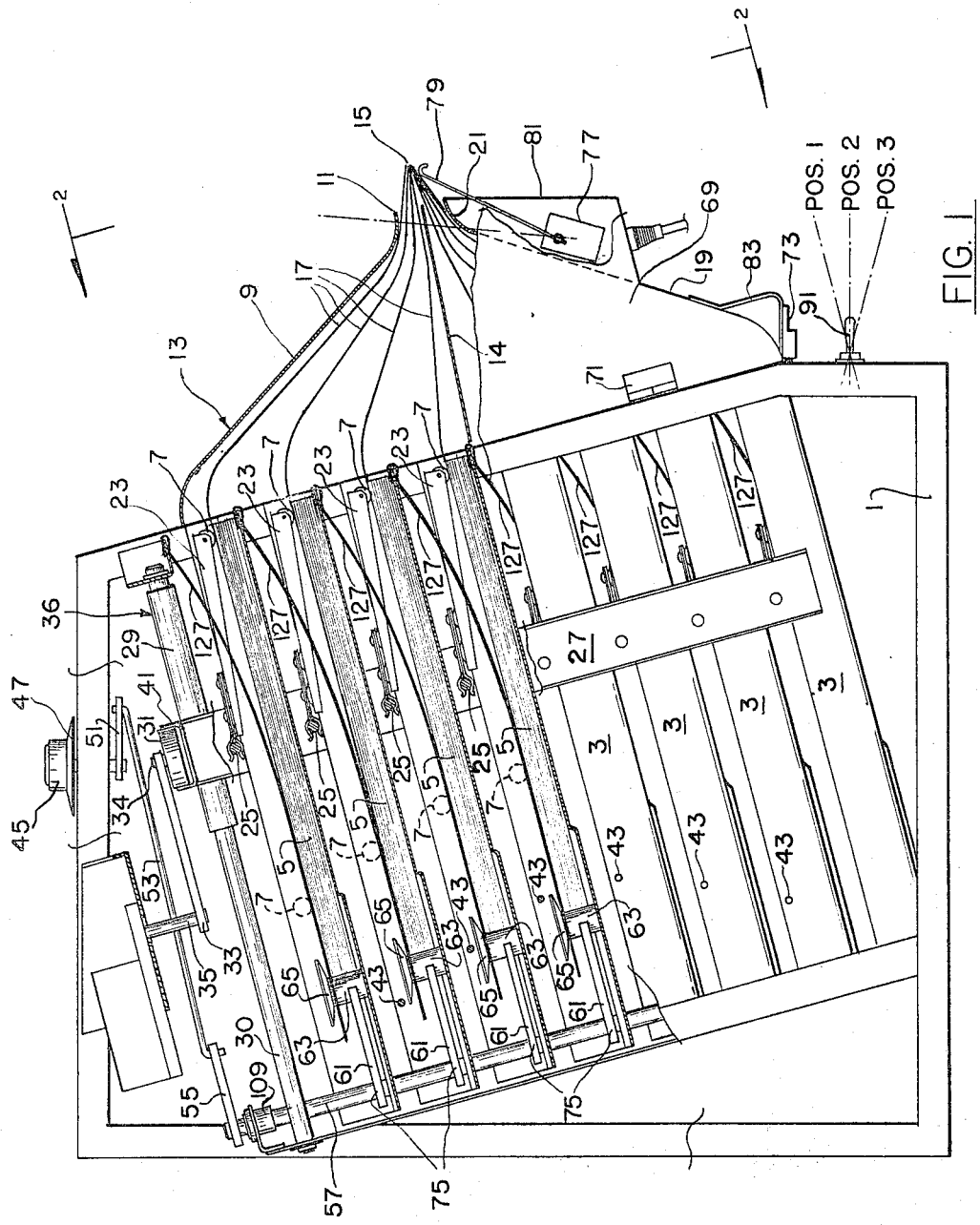
FIGURE 1 is a side elevational view of the collating machine with parts removed and a portion of the trays broken away to illustrate the interior of the collator and showing the gatherer for the pages which are in trays stacked vertically within the collator.

Referring now to the drawings, in all figures like numbers refer to like parts. With reference to FIG. 1, there is shown a number of trays 3 for receiving and retaining the paper sheets to be collated, the trays forming part of the framework 1. In the upper four trays, the sides are broken away (FIGURE 1) to illustrate paper 5. Pushers or actuators 23 include friction rolls 7 which contact the sheet to advance the sheet out of the trays 3. The rolls terminate their delivery stroke adjacent to the outer edge of the trays 3 (FIGURE 1). The paper or single sheets delivered by each pusher arm 23, out of each of the trays 3, enter a gatherer 13 which guides all sheets from the respective trays 3 so that their leading edges or ends are all conveyed to a single central location 15 where all may be simultaneously grasped by one finger and thumb and easily withdrawn as a set of sheets consecutively arranged.

The primary parts of the gathered 13 are curved plates 9 and 19 with flat plate 14 between, all three plates being held by a side plate 69, and so formed and arranged as to guide the sheets to a single location 15.

A guide, such as plates 9 and 19, is not used or needed above or below the other trays above or below the center as each sheet will be guided downwardly or upwardly by the sheet immediately above or below. However, in order to center the point of delivery, a flat plate 14 is mounted between the top half and the bottom half of the trays and extends approximately even with the curved ends 11 and 21 of the curved plates 9 and 19, thus confining the travel of the sheets in the top and bottom half of the collator to the area between the curved plate 9 and curved plate 19.

Each sheet dispensed from its respective tray, except the sheets from the two center trays, forms a guide for the sheets in contact with it and adjacent to it. The general positions of the sheets during delivery are shown at 17. The sheets in the trays in the lower half of the collator are delivered and guided in the same manner except the curved guide plate 19 is directed in an upward manner and the delivery end curve 21 terminates below the outer end of the flat center plate 14 substantially the same distance as delivery end curve 11 above.

Figure 6:
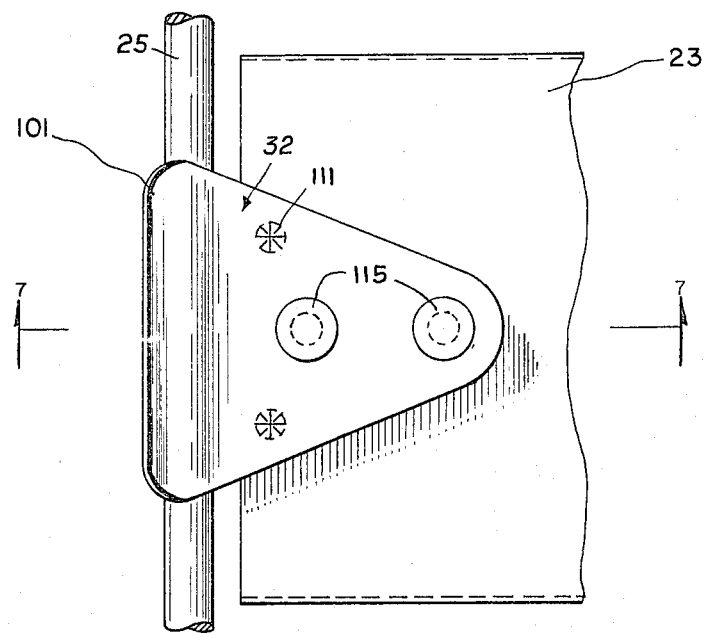
FIGURE 6 is a fragmentary detail view of the mounting structure for the pusher constituted by a latch and pivot assembly and looking from the top thereof.

All of the pusher arms 23 are fastened by quick disconnect clips 32 to shafts 25 (FIGURES 3, 6 and 7) which are positioned in holes 26 in vertical channels or other elongated structure 27 (FIGURES 3 and 4) and secured with metal friction fasteners 28.

Mounted rigidly to the frame are two stationary shafts 30, one on the left side near the top of the machine and the other, a duplicate, on the right side for slidably receiving the movable long housings 29 which are each fitted with suitable bearings at their ends (not shown). A top channel 41 and two channels 27, one on each side, are firmly fastened to housings 29. Therefore, parts 27, 29 and 41 are all fastened together and constitute a rigid carriage assembly 36, which moves reciprocally as such on shafts 30 by the action of motor 37, acting through a speed reducer 39, shaft 35, arm 33, pin and roller 31, as illustrated in FIGURE 1.

Roller 31 moves with adequate clearance between the two flanges forming channel 41, which channel is fastened to the top of each of the two channels 27 and which latter operably push all of the pushers 23 through the same distance and simultaneously as the shaft 35 rotates, the arm 33 rotates and the roller 31 urges the channel 41 and the two channels 27 to move forward and backward through a distance by which the pages in the uppermost and lowermost trays must be pushed to have the leading edges thereof reach a terminal point 15. To accomplish the same results with the second, third and fourth trays, the paper pushers 23 must push each succeeding sheet toward the center a shorter distance than the one in outside position. This is accomplished by permitting the pushers 23 to contact the second, third and fourth pages only at points successively closer to the front of their respective trays than is the case with the outermost pushers. To accomplish this same result with the fifth, sixth and seventh trays, the same action takes place except that they are in reverse.

The pusher 23 in the top tray makes its complete travel starting and ending with rolls 7 in constant engagement with the top sheet of paper or page in the tray. Under each of the remaining pusher arms with the exception of the lowermost pusher arm, there is a small diameter rod 43 which is held by the side of the trays and passes through the sides thereof and thus across from one side to the other. These rods are so positioned as to raise the pusher arms upwardly and cause the rolls 7 to be lifted from the paper at predetermined points, the rods 43 being located so that the shorter the distance the paper must be advanced the longer the rolls 7 are held out of engagement with the paper. Thus, the trays at the middle of the apparatus, which carry paper that is advanced the least distance, has its rod 43 positioned nearer the front or delivery end of the tray and the rods 43 above and below the center plane are proportionately positioned to advance their respective papers by greater amounts such that all of their forward edges will converge at point 15 with the other papers.

Fastened to the outside face of paper guide 19, lower half, is a small housing 81 in which is mounted a standard switch 77 which operates with a very sensitive action, by movement of a wire control part 79 which in operation swings between starting and stopping operations by contact with paper reaching the terminal point 15. When the wire control part is in position operated by the ends of the sheets as shown in FIG. 1, the current to the main motor 37 is cut off and the collator stops quickly by action of a magnetic brake (not shown). This occurs when switch 91 is in position 1 and the paper is in the position illustrated in FIG. 1. The operation of the feeler switch 77 is caused by the edges of the delivered paper pushing against the wire lever 79 which before being pushed forward by the paper was in retracted position. If switch 91 is in position 1 the advancing paper will stop the machine when it has reached the predetermined position 15. After the paper is withdrawn, the wire lever on switch 77 returns to its original position by a very light spring force and again is in position to intercept a new set of paper.

Figure 2:
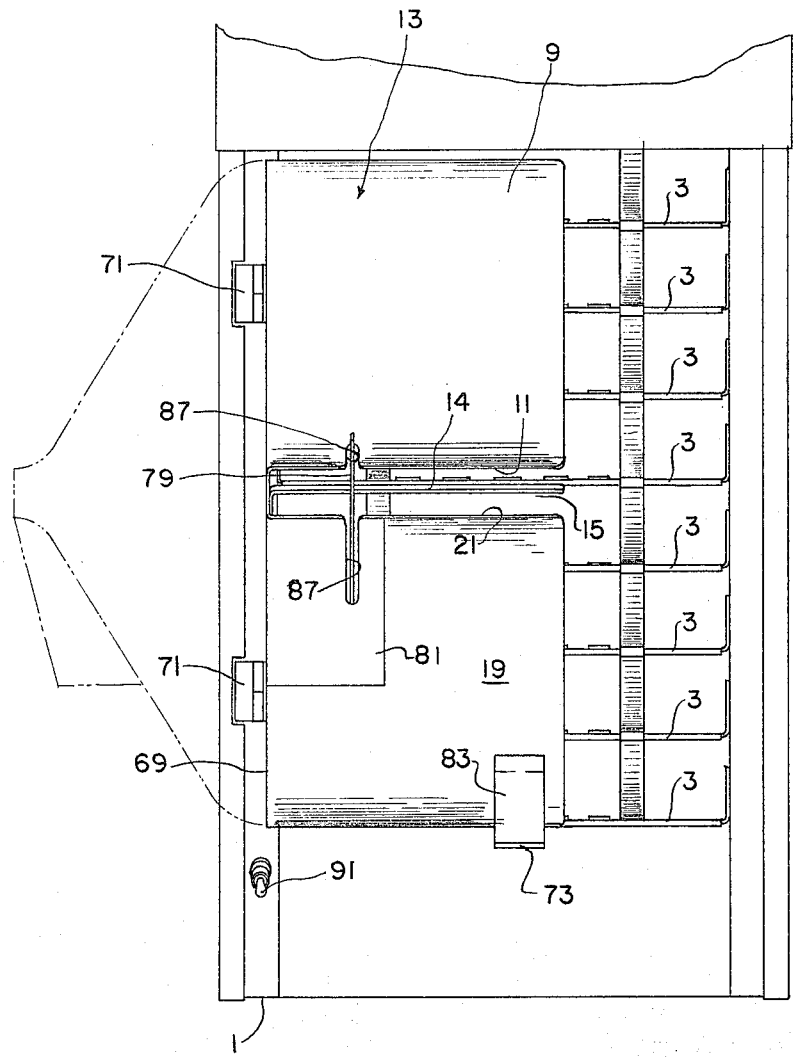
FIGURE 2 is a front elevational view looking in the direction of arrows 2—2 in FIGURE 1 and illustrating in dotted lines the position of the gatherer when it is swung to the left.

When switch 91 is in position 3 (FIGURE 1), switch 77 becomes inoperative and the collator will run continuously. In order to permit the movement of the wire lever of switch 77, suitable slots 87 are provided in the upper paper guide 9, in the lower paper guide 19 (FIGURE 2), and in the housing 81.

The distance of travel of the pushers 23 is independent of the length of the paper being collated, each page in a respective tray being thrust outward toward the collecting point 15 a predetermined distance.

As previously described, the collator has a three-way switch 91 by the use of which the operation can be made continuous or automatic. Thus, the output of each machine is governed mainly by the operator within the limits of machine capacity, and the ability of the operator to remove the sets of pages in proper order. When the switch is used for intermittent operation, the removal of a set from the machine will automatically cause it to restart and deliver another set and wait, if necessary, until this set is removed. By a flip of the switch 91 the collator can be made to run continuously at the regularly designed speed of about 25 sets per minute. Moving the same control switch 91 to the center position will stop the machine entirely. Obviously an electric motor drive can be used which will operate the collator at different or various speeds if desired, or a regular motor can be used to run the machine at some other rate than 25 sets per minute. However, it is believed that a standard rate of 25 sets per minute will be most acceptable and in any case, the manufactured article will probably have a standard speed and motor in order to maintain low production costs.

The guides 9, 14 and 19 are fastened to, and supported by, a side plate 69 (FIGURES 1 and 2), not otherwise shown. The gatherer 13 and all other parts attached thereto is held in position by suitable hinges 71, which permit the entire assembly to be swung open to the dotted line position (FIGURE 2) away from the face of the machine thus exposing the ends of all of the trays and permitting easy loading of the trays with the sheets of material to be collated. The hinges 71 are preferably of the detachable type in order to facilitate complete removal of the gathering hood assembly as an aid in packing for shipment.

The gatherer assembly 13 when in place and closed ready for collator operation, is held closed by a suitable magnet 73 which is supported by and mounted on bracket 83 (FIGURE 1), which latter is firmly affixed to plate guide 19 by any suitable means. Hinges 71 are fastened to the side plate 69 of the gatherer and to the frame 1.

When the switch 91 is set for intermittent operation the operator can run two or more collators in sequence, or the operator can operate two collators simultaneously. In other words, the operator can remove the assembled pages from Collator No. 1, Collator No. 2, and Collator No. 3 in sequence and assemble 24 pages, or, the operator can remove the gathered pages from Collator No. 1 with one hand, and the pages from Collator No. 2 with the other hand and assemble them simultaneously.

When the switch is set for continuous operation as previously described, the collator will run continuously regardless of the failure of the operator to remove the sets in proper time. However, if the operator fails to remove a gathered set with the switch in position 3, the paper pushers will draw the pages back into their individual trays and then refeed the same set, thereby preventing jamming in the guides due to the operator's failure to remove the gathered set.

Since this collator is designed to accommodate paper of widths from approximately 5″ to 8½″ no changes in side guides are necessary. However, since the collator must accommodate lengths of from 10″ to 14″ inclusive, a suitable means of adjusting for these different lengths is necessary. This is most easily and simply accomplished by merely "dialing" the knob 45 on the top of the machine which is calibrated to indicate the lengths it provides. Knob 45 (FIGURES 1, 8, 9, 10, 11 and 12), has a skirt 47 upon which is mounted a pointer. A suitable scale is mounted immediately below indicating the length of paper about to be collated. The scale 93 (FIGURE 10) is mounted on the top of the machine cover by any suitable means.

The knob 45 (FIGURES 1, 8, 10 and 11), is fastened to short shaft 95 by set screw 96, or any other suitable means. Spring 49 (FIGURE 11) through which shaft 95 passes is intended to hold the knob assembly down to prevent pin 97 from slipping out of the holes or recesses 103 provided therefor. The lower end of shaft 95, opposite knob 45 has attached to it a lever arm 51 which is fastened to and turns with the shaft 95.

Shaft 95 is held in position by channel section 105 through which it passes. Near the bottom of shaft 95 will be seen an arm 51, firmly attached to shaft 95 by set screw 107. To support the shaft 95 are two holes, one in the top flange 106, and one in the lower flange 108 of the channel type section 105. These may or may not be equipped with suitable bearings.

In the lower flange 108 of channel shaped bracket 105, there are a number of holes 103, arranged in an arc (FIGURE 12), at a uniform radius from the axis of shaft 95. In the arm 51 is fastened a pin 97 which extends below the arm 51 sufficiently far to engage and extend through one of the holes 103.

Spring 49 is held compressed around shaft 95 and between the upper flange 106 of the bracket 105 and the arm 51 and thus the compression force exerted by the spring tends to hold the arm in a downward position, and holding the pin 97 in the proper hole or recess into which the operator has placed it by operation of the dial 45. In order to prevent lifting the knob too far a suitable retaining ring 113 is provided near the lower end of the shaft 95.

In the rear corner, and on the same side of the collator as the knob 45, is a bearing 109 for supporting a square or round shaft 57.

Near the extreme outer end of arm 51 is an opening 99 to receive one end of a rod 53 which is held assembled by a metal friction clip 54, or any other suitable device, which will allow the rod or shaft 53 to possess free movement except along a line parallel to the axis of shaft 95, as shown in FIGURES 11, 12 and 8.

Rod 53 though operating at an angle to the base of the order of 20° is connected through a hole 98 in arm 55 (FIGURE 9) and held in place by a metal friction clip 52 (FIGURE 8), or any other suitable device. Hole 98 is located in arm 55 at a distance from center line of shaft 57 approximately equal to the distance of hole 99 holding end of rod 53 from axis of short shaft 95. Arm 55 turns shaft 57 and the shaft 57 then rotates arms 61 through an arc of not more than 90°.

The shaft 57 is located with its axis perpendicular to the planes of the trays of paper and passes to a point below the lowest tray where its second bearing is located.

Fastened rigidly to this shaft are as many lever arms 61 as there are trays and each lever arm is precisely affixed at a very definite position on the shaft with respect to the trays as will be shown hereinafter. All of the lever arms 61 are parallel each to the other. Lever arms 61 provide the mechanism used to locate the back stop 63 for paper of different lengths. The arms 61 are fastened to the shaft 57 at points such as 75, FIGURES 1, 5 and 8, each point or location being in all cases slightly above the bottom of the corresponding paper tray to provide for turning movements.

Affixed to the outward end of each of arms 61 and extending above and below the arm, is a cylindrical part 63 which may be either hollow or solid and is welded or otherwise fastened to the arm 61 in any suitable manner; but, the joint should be smooth and it is preferable to extend arm 61 into the side of part 63. Part 63 has a flanged upper end 65 as shown in the drawings, FIGURES 1, 5, 8 and 9.

The paper 5 shown shaded in the upper four trays, is positioned by the parts 63 which serve as stops defining the positions of the paper stacks with the forward edges coincident with the forward edges of the trays, thus in the proper location for the pushers to perform properly.

In order to prevent any sheets of paper getting under the stops 63, a depression or recess 67, FIGURES 8 and 9, is formed in the bottom of each tray to receive the extended bottom of the cylindrical stop 63. Alternatively, the area 67 may be punched out. The stop fits into this depression and moves freely around the quadrant defined by the movement of arm 61. In FIG. 9 the relative amount of movement of the stop on the quadrant represents the difference between the shortest sheets of paper and the longest for which the machine is designed. The flanged top 65 of cylindrical part 63 is always above the stack of paper to prevent bypassing.

The pusher rolls are mounted over a substantial width of the paper so that the paper will be fed uniformly. Referring to FIGURES 3, 4, 5, 6, 7 and 13, the pushers 23 have a channel-like shape with a depth at the leading end sufficiently great to accommodate the shaft 123 upon which all of the pusher rolls 7 and the roller 119 are mounted.

The rolls 7 normally do not turn but may be turned manually for adjustment for wearing surface. The center roller 119 is free to turn on the shaft 123 at all times. Shaft 123 extends the entire width of the pusher assembly and is held between the two vertical sides of the pusher by extending through a hole on one side and is held by a screw 122 extending into the end of the shaft with a lock washer so that the shaft will not easily turn but can be turned by loosening the screw 122 slightly.

The purpose of being able to turn the shaft at times is to cause the rolls to present new, unworn faces to the paper whenever the rolls wear excessively. The shaft 123 is knurled (not shown) under the rolls 7 for the purpose of keeping the rolls in proper position.

On the bottom of the paper trays 3 are a number of strips or pads 121 and 118 (FIGURES 3 and 4) of relatively thin rubber or of such other suitable material as to induce an equal or greater friction between it and the bottom sheet of paper in a stack than the friction between the engaging sheet and the sheet directly above it. This tends to insure that the last two sheets in a stack will not be fed together. These strips extend along the length of the trays the total distance the paper may travel or be pushed. With one exception these rubber strips or pads 121 are of such a width that they occupy about 90% of the space between the rubber rolls 7. The center strip is immediately below the center roller 119 and is engageable by it for rotation thereon only after paper is out. Since the diameter of the center roller 119 is slightly less than that of the rubber rolls 7, these non-turning rolls 7 push the paper forward and into the gatherer 13. However, when all paper in any tray has been fed out, the roller 119 rides on the center rubber strip or pad 118 under it and the other nonturning rolls 7 move in the spaces 125 between the rubber strips 121 but are held above the surface of the tray in order to prevent excessive wear by sliding on the tray surface 3.

Figure 7:
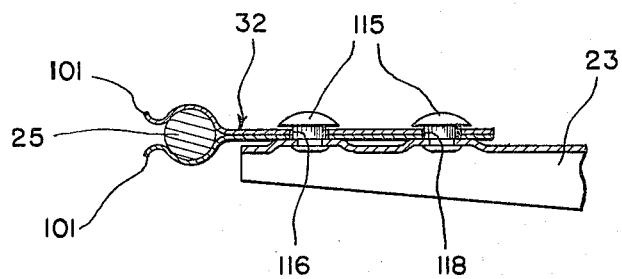
FIGURE 7 is a fragmentary part sectional view taken along line 7—7 of FIGURE 6.

With further reference to the pushers (FIGURES 6 and 7) a clip assembly is provided by which the pusher 23 is attached to shaft 25 for each individual tray. The clip assembly consists of two identical parts 101, spot-welded, or otherwise fastened rigidly together at points 111 and so designed as to spring over and grip tightly the shaft 25 as illustrated in FIGURES 7 and 8.

The clip assembly is fastened by shoulder rivets 115 to pusher 23. The clips 32 are provided with openings 116 and 118 slightly larger in diameter than the body of the rivets 115 so that the pusher arm 23 may rock about a longitudinal axis thereby permitting the rolls 7 to always be in uniform engagement with the uppermost sheet in the tray to prevent the sheets from being pushed sideways or rotated as they are dispersed from the machine.

An important feature of the paper pusher assembly relates to the ease with which the assemblies can be installed and adjusted for position. When the pushers are in their forward-most position, about even with the front edges of the trays, to remove a pusher assembly it is only necessary to grasp and pull it outwardly. To replace the assembly it is only necessary to insert a new pusher assembly at the proper place and, holding the rear end upward against the surface of the tray above, merely push toward the back of the machine until the clamp is engaged with the shaft 25. It is not necessary to see inside the machine. The pusher assembly may be easily moved by sliding clip 32 on shaft 25 from right to left or left to right without removing the assembly to correct the position of rolls with respect to the strips 121.

It will be observed that the trays of paper are at an angle to the horizontal of the order of 20°. It was found that the paper will feed more nearly perfect if the sheets are at an angle to the horizontal and fed upward.

Referring now to FIGURES 13 and 14 wherein a modified pusher arm assembly is illustrated, the reference numeral 200 designates an elongated pusher arm having downwardly turned flanges 202 and 204, a flat rotatable member 206 is provided with projections 208 and 210 adapted to be received in round openings disposed in the flanges 202 and 204. The rotatable member 206 is provided with offsets 216 and 218 for receiving elongated rubber traction members 220 which are adapted to contact the pages or sheets of paper in the tray.

It will be noted that the surfaces of the offset sections 216 and 218 of the rotatable member 206 have a relatively wide surface upon which the traction member is attached (FIGURE 14) so that when the pusher arm 200 moves back and forth the rotatable member 206 is permitted to rotate slightly so that the plane of members 220 will be substantially parallel to the surface of the paper, with the tray full or empty of paper. When the paper sheets are exhausted in the trays the member 206 will slide on the raised members 118 thus preventing the traction members 220 from coming in contact with the empty tray 3. After the collator has received substantial use the traction members 220 may be manually moved on the offsets 216 and 218 thus providing a new surface area of the traction members for engagement with the paper or sheets of material. The clip assembly 32 is constructed in the same manner as for the pusher 23.

It has been found that in collating certain types of paper, such as enameled stock or certain bond paper, that double sheets will sometimes be dispensed during the collating operation. In order to prevent this double inclusion of sheets we have provided a clip 224 as illustrated in FIGURE 15, which can be attached to each tray 3 by means of arms 226 (one of which is not shown), disposed above the tray member and arm 230, which is disposed below the tray member. The clip 224 is provided with a downwardly turned member 231 having an upwardly turned flange 232 for securing a flexible elastomer member 234 therebetween. The member 230 is positioned so that it will hold the elastomer member 234 at an angle with respect to the top surface of the tray. The length of the elastomer member 234 is such that it will contact the paper sheets that are being collated and will permit the top sheet to pass thereover while applying sufficient friction to retain or prevent any additional sheets from being dispensed other than that intended.

Any pages fed out to the gatherer and not withdrawn by the operator are drawn back into the machine to their original positions. The pages returned by the pushers do not become buckled or damaged due to the presence of two or more strips of thin spring steel 127 which hold the sheets down and in proper place.

These springs make it possible to collate much thinner paper than is possible in units as the art now exists. The rolls or traction members, by virtue of not rolling on the return stroke tend to pull any pages partially pushed out with previous sheet back into the tray. The stop cylinder 64 in turn prevents the rear edge of the paper from extending further into the tray. The flat springs prevent this condition by exerting a distributed downward force on the top sheet, preventing the thin paper from buckling on the return stroke of the pusher. The springs 127 are fastened to the paper tray above at the lead edge thereof by any suitable means.

Referring now to FIGURES 16 and 17 wherein a loading control mechanism is illustrated, the reference numeral 240 designates a sliding bracket adapted to be mounted on the upper and lower trays. The bracket 240 is provided with side flanges 242 and 244 having studs 246 and 248. It should be noted that the bracket 240 is recessed so that when it is positioned on the trays it will be in substantially the same height with respect to the trays as the rod 43. A cable 250 is connected to stud 246 on the upper tray and is connected to a control lever 252 passing over idler rollers 254 and 256. A second cable 251 is connected to the studs 246 mounted on the lower tray bracket 240, and is connected to the control lever 252 passing over the idler roller 254. An identical set of cables and rollers (not shown) are mounted on the other side of the frame 1 and are connected to studs 248 on each tray and to a control lever (not shown), similar to lever 252, but not projecting through frame 1. The levers are both secured to a rod 255 which passes through holes in bracket 266 and an identical bracket on the opposite side (not shown). A normally closed micro switch 258 is connected in series with the motor 37 and is attached to the lower sliding bracket 240 by a plate 241. The micro switch is provided with a plunger or actuator 260 which is adapted to be actuated by the lower shaft 25 when the control lever 252 is in position 2 as illustrated in FIGURE 16. A return spring 262 for the lower tray is connected to the bracket 240 and to the frame 1 by a mounting bracket 264. A similar spring 262 attached to the top tray bracket 240 is attached to the frame members 1 by a shaft 263 extending through holes in both side frame members 1 and held with friction clips at each end (not shown). The control levers 252 are mounted securely to the shaft 255 by welding or other suitable means. The shaft 255 is provided with a friction device (not shown). The friction device is necessary to assure the control levers 252 of staying in position 2, and is strong enough to overcome the force of the springs 262 acting through brackets 240 and the cable 250, 251 to the control levers 252.

*Operation*

To initiate operation, the structure 13 is first opened providing full access to all of the trays.

Before the pages are inserted in the trays, the dial 45 is turned to the correct length of paper to be collated to dispose the stops 63 so that the forward edges (the right hand edges of the pack, FIGURE 1) are substantially collinear. If the pages are longer than those indicated in FIGURE 1, the knob 45 is turned so that the stops 63 are moved toward the back, and for shorter pages the stops 63 are moved forward. In order that all of the collating operations will remain the same, regardless of page length, it is necessary that in each instance the forward end of the page be initially located at the same point in the apparatus, substantially even with the front face.

Adjustment of the stops 63 takes place by turning the knob 45 which moves the rod 53 and rotates shaft 57 on which are mounted levers 61, each having a stop 63 for each respective tray. The stops 63 are therefore all moved simultaneously and are each disposed at the same relative location within its respective tray.

The control lever 252 is moved to position 2 as illustrated in FIGURE 16, which will move the brackets 240 forward so that their front edges are in substantially the same relative location as the rods 43 in either of the immediately adjacent trays. The switch 91 is set to desired position 1 or 3, and the motor 37 is operated to position the carriage 36 to the rear location shown in FIGURE 16. The lower pusher shaft 25 will press the actuator 260 thus opening the micro switch 258 which is in series with the motor 37. The front edges of brackets 240 will raise the upper and lower pusher arms 23 as illustrated in FIGURE 16, and the other pusher arm 23 are raised by contact with shafts 43 at or near the back end of the stroke. The stacks of pages are inserted endwise into each of the trays in the numerical order in which they are to be collated. In other words, the pages will be assembled in the same order of their occurrence from one tray to the next within the vertical trays. All pages within the same tray are of course naturally identical. After all of the trays have been loaded, the control lever 252 is moved to the position 1 and the springs 262 will return the brackets 240 to the rear of the trays 3 along with the micro switch 258. The microswitch actuator 260 will be disengaged from contact with the lower pusher shaft 25 closing the motor circuit and starting the collator to function as the selector switch 91 had previously been set.

If desired the pusher lift control mechanism can be omitted, in which event the motor 37 is operated to bring all pusher arms to the front edge of the trays 3 so that they may be lifted manually and held up while the stacks of pages are inserted endwise into the trays in the numerical sequence in which they are to be collated.

There is provided a small shelf (not shown) which provides a horizontal smooth surface for "jogging" the pages received.

Assuming now that automatic operation of the collator is desired, the switch 91 is moved to position 1 and with all of the trays filled, the collator will commence to dispense a packet of collated pages and the machine will then stop until the packet is removed.

During operation each pusher arm 23 having a number of spaced friction rolls 7 or traction members 220 engages the pages along sufficiently spaced locations so that the pages will move endwise collinearly with the pusher arms. That is, the page will not slip or twist as it moves with its arm 23. The arm is moved upwardly and to the front (FIGURE 1) to dispense the page, this movement occurring by reason of the motor 37 acting through reducer 39, shaft 35, lever 33, and carriage assembly 36 which has a plurality of spaced shafts 25, one for each arm 23 to communicate driving force to the arm. The arm is attached to the shaft 25 by a spring clip 32 so that the arm can be readily attached and detached and the arm can also pivot slightly on an axis which extends through the two rivets 115 (FIGURES 6 and 7) so that the rolls 7 or traction members 220 can conform with the plane of the paper and can be engagement uniformly therewith but cannot swing to the right or left. The arm inclines downwardly toward the surface of the page and as it moves in a dispensing direction the rolls 7 or traction members 220 develop sufficient frictional to force to separate the uppermost page and cause it to slide in a dispensing direction.

Figure 5:
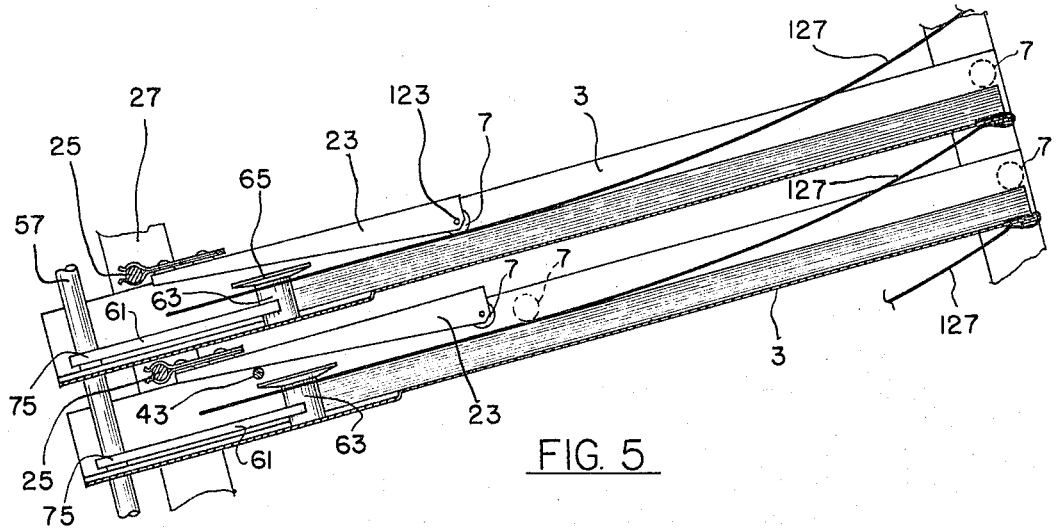
FIGURE 5 is a detail view of the upper two trays in FIGURE 1, having broken sections and illustrating one of the pushers in contact with the uppermost page and in driving position, and the lower pusher assembly is in disengagement with the paper but in the dotted line position, moves into driving connection after having traveled to the dotted line position.

In order to accomplish such even stacking the pages at the uppermost and lowermost trays must travel the farthest and downward graduation in travel occurs going toward the center of the apparatus so that the middle trays (FIGURE 1) has its paper dispensed the least distance. The result is accomplished very conveniently by actuating the pusher arms in each tray the same distance but by controlling the point at which the friction rolls 7 or fraction members 220 of the pusher arms 23 come into contact with the page; in this manner, it is possible to regulate the extent of displacement of the page. For example, in FIGURE 1, the friction rolls 7 at the uppermost and lowermost trays is in engagement with the paper at all times and, therefore, paper in these trays is dispensed through the full travel of the pusher arms 23, but in the succeeding trays the pusher arms are in engagement with rods 43 for a part of the travel of the pusher arms to hold the friction rolls 7 out of engagement with the paper until the arm has traveled certain additional distances (FIGURE 5).

For example, the pusher arm in the second higher tray is held out of engagement until the inclined surface of the pusher arm has traveled past 43 by an amount sufficient to allow roller 7 (FIGURE 5) to engage the uppermost page and then after a further amount of additional travel the next lower pusher arm (FIGURE 5) is moved in relation to its rod 43 so that its roller 7 will come into engagement with the uppermost page in its tray. The location of the rods 43 determines the point at which the pusher becomes effective in contacting and dispensing the page and by proper location of the rods 43 the pages in the respective trays will move by differential amounts so that the leading edges of the pages will come into substantially line-to-line convergence at the opening (FIGURE 1).

The pages are then concurrently grasped between the thumb and index finger and pulled the rest of the way from the trays, but before doing so the ends engage wire lever 79 which operates feeler switch 77 that in turn deactuates motor 37 until the packet is removed and the wire lever 79 then returns to its original position, causing the motor to recycle and an additional dispensing operation will occur. During the retraction of the pusher 23, downwardly and to the left in FIGURE 1, the leaf springs 127 will hold the uppermost page against wrinkling as the friction rolls or traction members are drawn over the surface of the page.

While this collator is designed to collate eight pages there is no reason that a lesser number may not be collated, if desired, in the same machine.

Since this collator is comparatively narrow, two or more such collators can be placed close together, side by side, and operated by one person. In this way pages numbered 1 to 8 can be collated in one machine, pages 9 to 16 in a second, and pages 17 to 24 in a third. When more than one collator is utilized, it is desirable to operate the collators on the intermittent operation. It has also been found that in actual practice by operating two collators that the production of the operator will be increased approximately double of the single operation.

The operation of each collator can be made continuous by moving the switch from position 1 or position 2 (position 2 being the off position), to position 3 which eliminates feeler switch 77 from the motor circuit and, therefore, motor 37 will be actuated to cause the pushers 23 to dispense the uppermost pages in the trays to their positions shown in FIGURE 1 for removal and if the pages are not removed the motor 37 will continue operation, causing the pushers 23 to return the dispensed but unremoved sheets to their original positions. Thus, at every predetermined time interval pages will be dispensed, either the same pages or a new set of pages. This operation is generally used where there is continuous, long period operation of a single machine and there is little chance of confusion to the operators.

Figure 3:
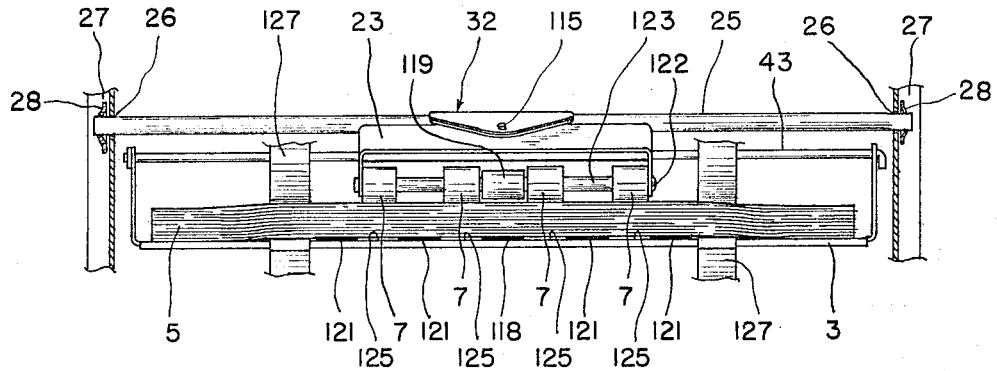
FIGURE 3 shows in front detail view a tray of paper with the pusher assembly in operative position upon a stack of paper or other sheets in the tray.
Figure 4:
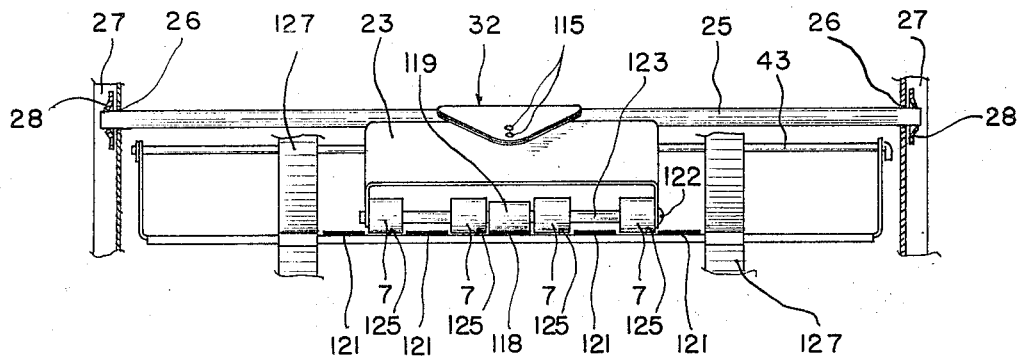
FIGURE 4 is the same view as FIGURE 3 but illustrating the tray after it has been emptied of the paper pages or sheets shown in FIGURE 3.

When all of the pages have been dispensed from the tray, the rolls 7 or traction members 220, which are non-rotatable, are prevented from rubbing against the bottom of the tray by means of spaced slots 125 which prevent the rolls 7 or traction members 220 from directly engaging the bottom of the tray. In respect to the rolls 7 the weight of the dispensing arm is carried instead by a small diameter rotatable roller 119 which engages the strip 118 on the bottom of the tray. In this way, the reciprocation of the arm will not produce any wearing effect by abrasion of the rolls 7 against the bottom of the tray. Rolls 7 are smaller than their companion slots 125 in the bottom of the trays so that the arm can move slightly without binding against the edges of the slots. The bottommost page is supported by ruber strips 121 and the slots 125 between the rubber strips are small enough in dimension so that the paper will not merely compress within the slots, but will be caused to slide on the supporting surfaces of the strips 121 (FIGURES 3 and 4).

The rolls 7 and the traction members 220 can be rotated manually from time to time to vary the line of engagement with the paper thereby minimizing wear and preventing flat spots from developing thereon.

Although the present invention has been illustrated and described in connection with selected example embodiments, it will be understood that these are illustrative of the invention and are by no means restrictive thereof. It is reasonably to be presumed that those skilled in this art can make numerous revisions and adaptations of the invention without departing from the underlying principles of the invention. It is intended that such revisions and variations which incorporate the herein disclosed principles will be included within the scope of the following claims as equivalents of the invention.

We claim:

1. Apparatus for collating pages comprising the combination of:
    (a) a plurality of storage means adapted to receive and store therein stacks of pages which stacks are separated according to a preferred sequence of assembly,
    (b) elongated pusher means coacting with said storage means and having a friction member at the end thereof engaging with the uppermost page in the storage means to effect translating effort thereon, means supporting said pusher means for free vertical movement,
    (c) an actuating device for simultaneously effecting displacement of said pusher means whereby pages are displaced from the plurality of pages in said storage means and in a preferred sequential order, and,
    (d) means spaced at preferred locations along the line of travel of said pusher means effective to control the descent of said pusher means to bring the friction member of the pusher means into frictional engagement with the uppermost page at a preferred point of longitudinal travel of said pusher means and dispense such pages from said storage means by differential amounts adjusted to bring the projecting ends of the pages from the respective storage means into substantial alignment.

2. Apparatus for collating pages comprising the combination of:

(a) a plurality of storage means adapted to receive and store therein stacks of pages which stacks are separated according to a preferred sequence of assembly into a respective one of said storage means, (b) elongated pusher means coacting with each one of said storage means and each pusher means having a friction member at the end thereof engaging with the uppermost page in its storage means to effect translating effort thereon, means supporting said pusher means for free vertical movement (c) an actuating device for simultaneously effecting displacement of said pusher means whereby pages are concurrently displaced from the plurality of said storage means and in a preferred sequential order, (d) means spaced at preferred locations along the line of travel of said pusher means effective to control the descent of said pusher means to bring the friction member of the pusher means into frictional engagement with the uppermost page at a preferred point of longitudinal travel of said pusher means and dispense such pages from said storage means by differential amounts so adjusted as to bring the projecting ends of the pages from the respective storage means into substantial alignment, (e) means for defining the stored position for the stacks of pages in a respective storage means by engaging the rear end of the stack, and, (f) adjusting means for varying the location of said defining means whereby the pages, regardless of length, are disposed with the forward ends in the storage means at preferred locations therein.

3. In a collating device:

(a) a plurality of storage means each having a stack of pages which are intended for assembly in a sequential order, (b) dispensing means for displacing simultaneously a page from each of the respective stacks whereby one page from each stack is projected outwardly in converging relation with a projecting end of each of the other dispensed pages, (c) power means for actuating said dispensing means in simultaneous operation, (d) guide means for directing the line of travel of the projecting ends of the pages whereby such pages are caused to converge at a location for removal, and (e) switch means engageable by the converging pages and adapted to deactuate said power means whereby said collator cycle is automatically terminated following each collating operation and will automatically recycle when the collated pages are removed, said switch means further including means for disabling said deactuation.

4. In a collating machine, a dispensing device, comprising:

(a) mounting arm inclined in the direction of the line of dispensing travel, (b) friction means at the advancing end of said dispensing device to engage the uppermost page and cause it to separate from the remaining pages and move in a dispensing direction, said friction means being spaced laterally with respect to the page to provide a plurality of gripping surfaces which cause the page to move linearly with the dispensing means, (c) a supporting surface in the form of fixed nonremovable trays for said pages and including a plurality of open spaces which are located complementary with the friction members of said dispensing means whereby when all of the pages are dispensed said friction means are caused to move within said open spaces, and (d) rotatable means forming a part of said dispensing device and which is brought into weight supporting relation with said support to provide for substantially frictionless movement of said dispensing device when the pages are dispensed.

5. In a collating apparatus, the structure comprising:

(a) plurality of vertically spaced storage means disposed at an angle of the order of 20 degrees inclination to the horizontal and adapted to receive therein spaced packs of pages from which are dispensed single pages which are assembled in a sequential order corresponding to the order of vertical occurrence of the pages in the storage means, (b) a stop means defining the position of each stack of papers by engagement along the trailing edges of the stack of papers, (c) shoulder means along one end of said stop means, (d) means forming a recess whereby each said stop means can extend below the bottommost page in its coacting storage means to be in effective supporting relation with all of the associated pages, (e) lever means for moving the stop means and relocating the point of support for said pages whereby pages of different lengths can be accommodated within its storage means, and (f) means disposed exteriorly of said apparatus for adjusting the location of said stop means, said pages being inclined from a horizontal position to be at all times in engagement with its stop means which defines the location thereof within the companion storage means.

6. In a collating apparatus, the structure comprising:

(a) a plurality of vertically spaced storage means adapted to receive therein spaced packs of pages from which are dispensed single pages which are assembled in a sequential order corresponding to the order of vertical occurrence of the pages, (b) stop means defining the position of each stack of papers by engagement along the trailing edge of the stacks of papers, (c) and externally operated adjuster means for varying the positions of said stop means within their respective storage means to adjust for different lengths of papers, and (d) calibrated dial means in combination with said exterior actuating means to provide a setting for the stop means which adapts for the length of the page added to the storage means.

7. The structure in accordance with claim 6 including an angular track forming a partial recess within the weight supporting surface of the storage means for said pages, said stop means being movable angularly to vary the location of support for the stack of pages and thereby adjust for page lengths received within a respective support means.

8. An apparatus for collecting pages in accordance with claim 1 including loading control means for lifting certain of the pusher means so that paper can be loaded into each storage means.

References Cited by the Examiner

UNITED STATES PATENTS

| | | | |
|---|---|---|---|
| 2,505,925 | 5/1950 | Van Haase | 270—58 |
| 2,599,829 | 6/1952 | Hernblad | 270—58 |
| 2,624,571 | 1/1953 | Dixon et al. | 270—58 |
| 2,753,180 | 7/1956 | Thomas | 270—58 |
| 2,993,692 | 7/1961 | Thomas | 270—58 |
| 3,152,801 | 10/1964 | Quinn et al. | 270—58 |

EUGENE R. CAPOZIO, *Primary Examiner.*

N. M. ELLISON, *Assistant Examiner.*